(12) United States Patent
Blankart

(10) Patent No.: US 7,677,669 B2
(45) Date of Patent: Mar. 16, 2010

(54) METAL STRUCTURE AND VEHICLE SEAT

(75) Inventor: Axel Blankart, Leichlingen (DE)

(73) Assignee: Johnson Controls GmbH, Burscheid (DE)

( * ) Notice: Subject to any disclaimer, the term of this patent is extended or adjusted under 35 U.S.C. 154(b) by 91 days.

(21) Appl. No.: 11/664,334

(22) PCT Filed: Sep. 22, 2005

(86) PCT No.: PCT/EP2005/010268

§ 371 (c)(1),
(2), (4) Date: Mar. 30, 2007

(87) PCT Pub. No.: WO2006/037486

PCT Pub. Date: Apr. 13, 2006

(65) Prior Publication Data

US 2008/0277993 A1    Nov. 13, 2008

(30) Foreign Application Priority Data

Oct. 1, 2004    (DE) .................... 10 2004 048 351

(51) Int. Cl.
*A47C 7/02*    (2006.01)
(52) U.S. Cl. ................ 297/452.18; 297/452.2
(58) Field of Classification Search ............ 297/452.18, 297/452.2, 216.1

See application file for complete search history.

(56) References Cited

U.S. PATENT DOCUMENTS

| 4,350,390 | A | 9/1982 | Ogawa |
| 5,895,096 | A | 4/1999 | Massara |
| 6,739,673 | B2 * | 5/2004 | Gupta et al. ........... 297/452.18 |
| 6,817,672 | B2 * | 11/2004 | Matsunuma ........... 297/452.18 |
| 6,869,145 | B2 * | 3/2005 | Matsunuma ........... 297/452.18 |

FOREIGN PATENT DOCUMENTS

| DE | 2 303 289 | 8/1974 |
| DE | 33 08 496 C1 | 9/1984 |
| DE | 197 57 060 A1 | 6/1999 |
| DE | 199 05 215 A1 | 8/2000 |
| GB | 1 438 905 | 6/1976 |
| WO | WO 00/47441 | 8/2000 |

* cited by examiner

*Primary Examiner*—Anthony D Barfield
(74) *Attorney, Agent, or Firm*—Foley & Lardner LLP

(57) ABSTRACT

A metal structure for a vehicle seat, in particular for the backrest of a motor vehicle seat, is disclosed. The structure includes a deep-drawn front shell and a deep-drawn rear shell, in addition to at least one fitting that can be fixed to the metal structure with the aid of a fixing lug, the fixing lug being located between the front shell and the rear shell. The fixing lug is connected to the front shell and rear shell, for example by laser welding, which achieves a particularly favorable input of force from the fitting to the metal structure.

15 Claims, 2 Drawing Sheets

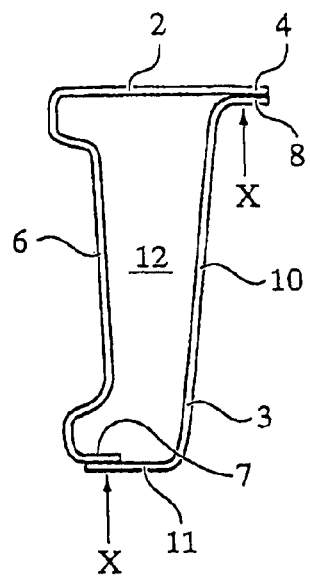
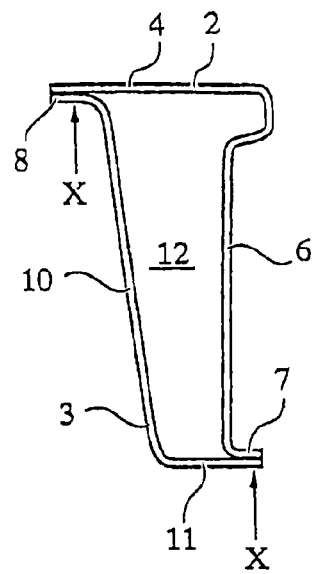
Fig. 2a　　　　　　　　Fig. 2b
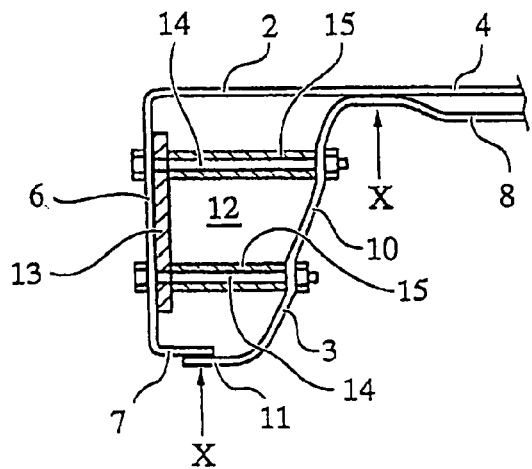
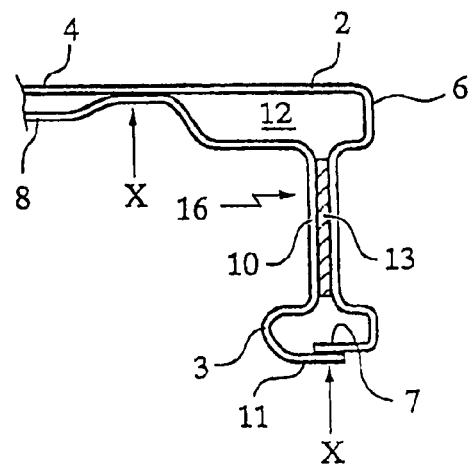
Fig. 3a　　　　　　　　Fig. 3b

METAL STRUCTURE AND VEHICLE SEAT

CROSS-REFERENCE TO RELATED PATENT APPLICATIONS

The present Application is a National Stage of International Application No. PCT/EP2005/010268 titled "Metal Structure and Vehicle Seat" filed Sep. 22, 2005, which claims priority to German Patent Application No. DE 10 2004 048 351.5 filed Oct. 1, 2004, both of which are incorporated herein by reference in their entireties.

FIELD

The present disclosure relates to a metal structure for a vehicle seat, in particular for the backrest of a motor vehicle seat, that includes a preferably deep-drawn front shell and a preferably deep-drawn rear shell, together with at least one fitting fixed to the metal structure with the aid of a fixing lug, the fixing lug being located between the front shell and the rear shell.

BACKGROUND

A metal structure of the generic type for the backrest of a vehicle seat is disclosed in WO 00/47441 A1. It comprises an integrally pressed rear shell having an inner surface area which is provided with openings and from which a rectangular bent flange extends forwards at the edge, together with an integrally pressed front shell having an inner surface area, which at the edge has a bent flange extending rearwards at right angles. Punched openings are provided in the inner surface area of the front shell, in such a way that the remaining areas of sheet metal have a corrugated spring structure. The front and rear shells have substantially the same wall thickness throughout and in the area of the overlapping bent flanges are connected together by spot-welding. The outer side of the body produced in this way is then partially covered with polyurethane foam.

In the area for attachment of the seat back rake adjusters (recliner) the lateral faces of the rear shell are provided with U-shaped beads. The fixing lugs of the seat back rake adjusters are inserted and bolted into these channel-like depressions. The fixing lugs on the backrest side are later completely hidden by the fitted front shell.

The metal structure of the seat part may also have the same construction.

This production concept is basically suited to the manufacture of high-quality vehicle seats. Since force is introduced from the fixing lugs into the body solely by of the rear shell, the latter is produced from a sheet metal of relatively large wall thickness. The weight of the metal structure is accordingly high.

SUMMARY

One exemplary embodiment relates to a metal structure for a backrest of a vehicle seat including a deep-drawn front shell, a deep-drawn rear shell, and at least one fitting fixed to the metal structure with the aid of a fixing lug, the fixing lug being located between the front shell and the rear shell. The fixing lug is connected to the front shell and the rear shell.

Another exemplary embodiment relates to a metal structure for a backrest of a vehicle seat including a front shell, a rear shell, and at least one fixing lug connected to and located between the front shell and the rear shell. Forces applied to the fixing lug are transmitted to both the front shell and the rear shell.

Yet another exemplary embodiment relates to a metal structure for a vehicle seat including a front shell having a first inner surface area and a flange extending at an angle from the first inner surface area, a rear shell having a second inner surface area and a second flange extending at an angle from the second inner surface area, and at least one fixing lug located between the first flange and the second flange. The first flange is connected to the second flange via the at least one fixing lug.

BRIEF DESCRIPTION OF THE DRAWINGS

The Figures show schematic representations of various exemplary embodiments, in which FIG. 2 shows a section along the plane A in FIG. 1 on completed assembly of the components represented there in a first embodiment (FIG. 2a) and a second embodiment (FIG. 2b), FIG. 3 shows a corresponding section through the plane B in a first embodiment (FIG. 3a) and second embodiment (FIG. 3b).

DETAILED DESCRIPTION

Figure 1:
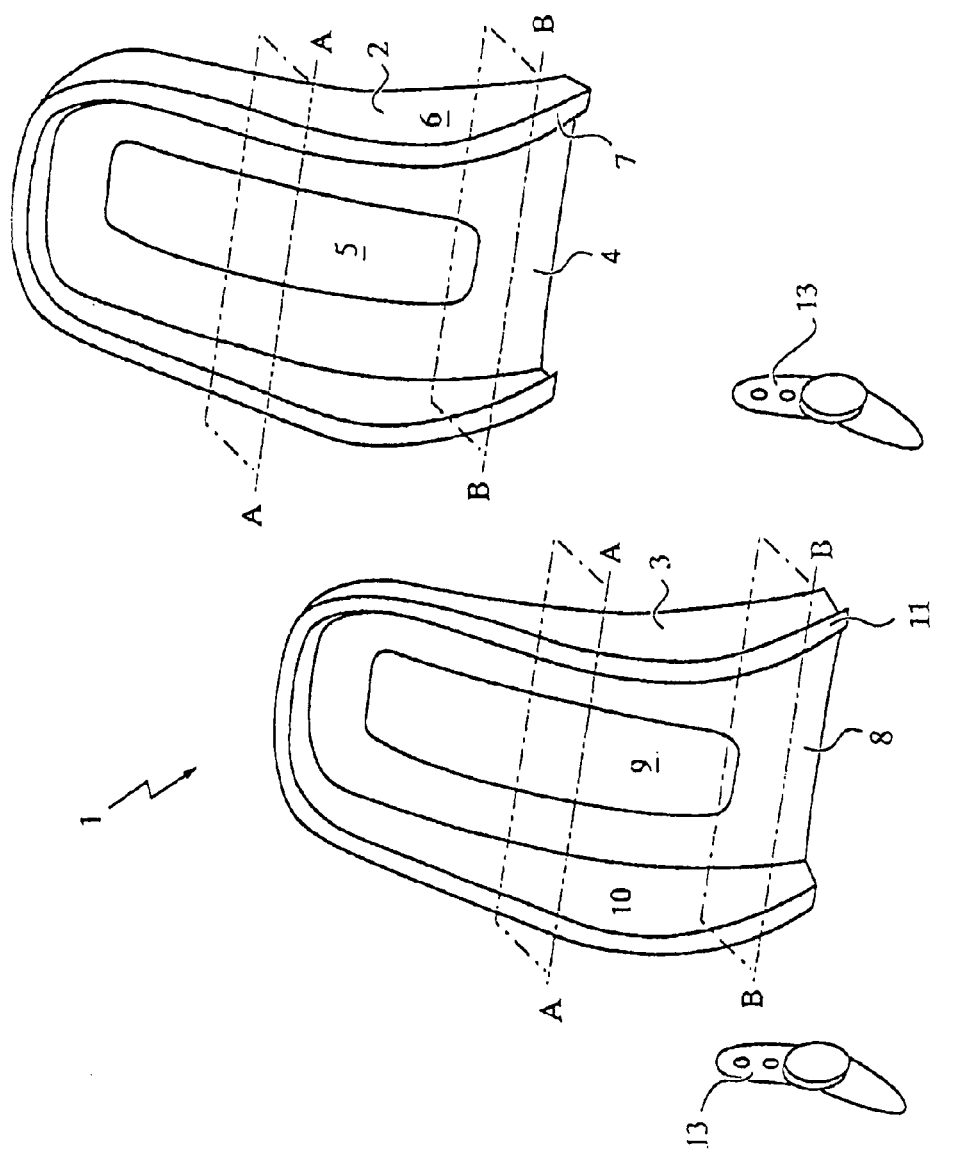
FIG. 1 shows a perspective view of the components of the metal structure of the vehicle seat.

One exemplary embodiment provides a lightweight metal structure for a vehicle seat affording adequate strength.

According to an exemplary embodiment, the fixing lug is connected to the front shell and the rear shell. By means of this connection, the forces, especially those due to overloading in the event of an accident, are introduced more uniformly into the metal structure, so that the overall, structure can be made lighter with thinner walls.

The fixing lug of the fitting is preferably of plate-shaped design, the front shell and rear shell each resting on a face side of the fixing lug. In this embodiment the fixing lug can be connected, preferably by laser welding, in the area of contact with the front shell and/or the rear shell.

The favorable introduction of force into the metal structure means that the front shell and the rear shell can be composed of thin sheet steel, such as QStE 420, for example. A suitable thin sheet steel has a wall thickness of 0.4 mm, to 0.6 mm, for example, approximately 0.5 mm.

According to one embodiment, the front shell and the rear shell are in some areas separated, forming a cavity, the cavity having a constriction serving to receive the fixing lug.

The fitting may take the form, for example, of a back rake adjusting device for the backrest of a motor vehicle seat. In the event of an accident, such fittings transmit particularly large forces from the backrest into the seat part, so that both the seat part and the backrest need to be of particularly lightweight construction.

The metal structure 1 according to FIG. 1 comprises a rear shell 2 and a front shell 3, which are each integrally pressed from a thin sheet steel of QStE 420 and a uniform wall thickness of approximately 0.5 mm, and have central punched openings 5, 9. The weight of each shell is approximately 700 g.

As can be seen from sections A and B through the assembled metal structure 1 shown in FIG. 2a and FIG. 3a, the rear shell 2 has a rear, inner surface area 4 with a central punched, approximately rectangular opening 5, from which at the edge a first bent flange 6 (itself repeatedly bent) extends forwards at an angle of 90°. Formed onto the front edge of the first bent flange 6 is a second bent flange 7, which is angled inwards by 90°. The inner surface area 4 and the second bent flange 7 consequently run substantially parallel to one another and in the same direction relative to the first bent flange 6. The first bent flange 6 and the second bent flange 7 at the same time run around the sides and the upper edge of the rear shell 2, whilst the lower edge of the rear shell 2 has no bent flange.

The front shell 3 is likewise provided with a rear, inner surface area 8 with central punched opening 9, from which a first bent flange 10 extends forwards at right-angles. Adjoining this is an outwardly directed second bent flange 11. The inner surface area 8 and the second bent flange 11 are again parallel to one another but extend in different directions away from the first bent flange 10. On the front shell 3 also, only the lower edge has no bent flanges.

In addition, the inner surface area 8 of the front shell 3 is smaller than the inner surface area 4 of the rear shell 2. In producing the metal structure 1, the front shell 3 and the rear shell 2 are fitted into one another so that the inner surface area 4, 8 and the second bent flanges 7, 11 rest on one another and can be connected together in the direction of the unidirectional arrows X by laser welding. The difference in size between the inner surface areas 4 and 8 here produces a U-shaped cavity 12 running around the edge of the metal structure 1, which increases the torsional rigidity of the metal structure 1.

As shown in FIG. 2b, the second bent flange 7 of the rear shell 2 may alternatively point outwards and in the overlapping area may be welded to the second bent flange 11 of the front shell 3. It is also feasible to have the second bent flange 7, 11 of both the front shell 3 and the rear shell 2 projecting inwards.

As can be seen from FIG. 3a, the plate-shaped fixing lug 13 of a seat back rake adjuster is located inside the cavity 12 between the rear shell 2 and the front shell 3 of the metal structure and is connected by bolts 14 to the front shell 3 and the rear shell 2. Whilst the fixing lug 13 rests directly on the first bent flange 6 of the rear shell 2, spacer bushings 15 bridge the gap between the fixing lug 13 and the first bent flange 10 of the front shell 3.

Even more beneficial in terms of the introduction of force is the embodiment represented in FIG. 3b, in which the fixing lug 13 is located in a constriction 16 of the cavity 12 and is connected directly both to the front shell 3 and to the rear shell 2 by laser welding. In this embodiment both the first bent flange 6 of the rear shell 2 and the second bent flange 10 of the front shell 3 are in turn repeatedly bent in the lower area of the metal structure 1, in order to produce the constriction 16. Yet again, these bends further increase the rigidity of the metal structure in the area where force is introduced into the seat back rake adjuster.

What is claimed is:

1. A metal structure for a backrest of a vehicle seat, comprising:
   a deep-drawn front shell;
   a deep-drawn rear shell;
   a fixing lug connected to the front shell and the rear shell, the fixing lug being a plate-shaped member having a first side surface and an opposite second side surface, the fixing lug being located between the front shell and the rear shell, wherein the first side surface is directly connected to the front shell and the second side surface is directly connected to the rear shell; and
   at least one fitting fixed to the metal structure with the aid of the fixing lug,
   wherein the front shell and the rear shell are in at least some areas separated, forming a cavity, the cavity having a constriction serving to receive the fixing lug.

2. The metal structure as claimed in claim 1, wherein the fixing lug is connected, by laser welding, in the area of contact with the front shell and the rear shell.

3. The metal structure as claimed in claim 1, wherein at least one of the front shell and the rear shell are composed of thin sheet steel.

4. The metal structure as claimed in claim 3, wherein the thin sheet steel has a wall thickness of 0.4 mm to 0.6 mm.

5. The metal structure as claimed in claim 4, wherein the thin sheet steel has a wall thickness of approximately 0.5 mm.

6. The metal structure as claimed in claim 1, wherein the at least one fitting comprises a seat back rake adjusting device for the back rest.

7. The metal structure as claimed in claim 6, wherein the fixing lug transmits forces applied to the fixing lug by the seat back rake adjusting device to both the front shell and the rear shell.

8. A vehicle seat having a metal structure as claimed in claim 1.

9. The metal structure as claimed in claim 1, wherein the first side surface of the fixing lug is substantially parallel to the second side surface.

10. The metal structure as claimed in claim 1, wherein forces applied to the fixing lug are transmitted to both the front shell and the rear shell.

11. The metal structure as claimed in claim 1, wherein the front shell and the rear shell each comprise a first inner surface area and a first flange extending at an angle from their respective first inner surface area.

12. The metal structure as claimed in claim 11, wherein the first flanges are substantially perpendicular to their respective first inner surface areas.

13. The metal structure as claimed in claim 12, wherein the first side surface of fixing lug is directly connected to the first flange of the front shell and second side surface of the fixing lug is directly connected to the first flange of the rear shell.

14. The metal structure as claimed in claim 11, wherein the front shell and the rear shell each farther comprise a second flange extending at an angle from their respective first flange, the second flanges being substantially parallel to their respective first inner surface area.

15. The metal structure as claimed in claimed 14, wherein the first inner surface area of the front shell rests on the first inner surface area of the rear shell and is connected thereto by laser welding, and wherein the second flange of the front shell rests on the second flange of the rear shell and is connected thereto by laser welding.

* * * * *